United States Patent
Werner et al.

(10) Patent No.: US 7,409,510 B2
(45) Date of Patent: Aug. 5, 2008

(54) INSTANT VIRTUAL COPY TO A PRIMARY MIRRORING PORTION OF DATA

(75) Inventors: Sam Clark Werner, Scottsdale, AZ (US); Gail Andrea Spear, Tucson, AZ (US); Warren Keith Stanley, Loveland, CO (US); Robert Francis Bartfai, Tucson, AZ (US); William Frank Micka, Tuscon, AZ (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 10/856,197

(22) Filed: May 27, 2004

(65) Prior Publication Data

US 2005/0268054 A1    Dec. 1, 2005

(51) Int. Cl.
*G06F 13/00* (2006.01)

(52) U.S. Cl. ............... 711/156; 711/147; 711/161; 711/162; 707/202; 707/204

(58) Field of Classification Search ......... 711/161–162, 711/156, 147; 714/1–2, 5–8, 50; 707/202, 707/204
See application file for complete search history.

(56) References Cited

U.S. PATENT DOCUMENTS

| | | | |
|---|---|---|---|
| 6,131,148 A | 10/2000 | West et al. | |
| 6,145,066 A * | 11/2000 | Atkin ................... | 711/165 |
| 6,253,295 B1 | 6/2001 | Beal et al. | |
| 6,442,709 B1 | 8/2002 | Beal et al. | |
| 6,446,176 B1 | 9/2002 | West et al. | |
| 6,499,112 B1 | 12/2002 | Milillo et al. | |
| 6,557,089 B1 * | 4/2003 | Reed et al. ............ | 711/162 |
| 6,611,901 B1 | 8/2003 | Micka et al. | |
| 6,772,303 B2 * | 8/2004 | Crockett et al. ........ | 711/162 |
| 6,996,586 B2 * | 2/2006 | Stanley et al. ......... | 707/203 |
| 7,000,145 B2 * | 2/2006 | Werner et al. ......... | 714/20 |
| 7,124,323 B2 * | 10/2006 | Sanchez et al. ....... | 714/19 |
| 2002/0078296 A1 | 6/2002 | Nakamura et al. | |
| 2002/0133512 A1 | 9/2002 | Milillo et al. | |
| 2003/0033494 A1 | 2/2003 | Fujibayashi et al. | |
| 2003/0110471 A1 | 6/2003 | Asco et al. | |

(Continued)

OTHER PUBLICATIONS

Kim Frank, "IBM TotalStorage Enterprise Storage Server (ESS)", Nov. 2001, pp. 1-12.*

(Continued)

*Primary Examiner*—Matthew Kim
*Assistant Examiner*—Hetul Patel
(74) *Attorney, Agent, or Firm*—Janaki K. Davda; Konrad Raynes & Victor LLP (57) ABSTRACT

Techniques are provided for performing a copy operation. An instant virtual copy operation is issued from a first portion of data to a primary mirroring portion of data, wherein the primary mirroring portion of data corresponds to a secondary mirroring portion of data, and wherein the primary mirroring portion of data and the secondary mirroring portion of data are in a mirroring relationship. The mirroring relationship is transitioned to a duplex pending state in response to determining that the mirroring relationship is in a full duplex state. When the mirroring relationship is in a duplex pending state, each block of data involved in the instant virtual copy operation is transferred from the primary mirroring portion of data to the secondary mirroring portion of data.

18 Claims, 6 Drawing Sheets

U.S. PATENT DOCUMENTS

| | | | |
|---|---|---|---|
| 2003/0158869 A1 | 8/2003 | Micka | |
| 2003/0177321 A1 | 9/2003 | Watannabe | |
| 2003/0187887 A1 | 10/2003 | Beal | |
| 2004/0250034 A1* | 12/2004 | Yagawa et al. | 711/162 |
| 2004/0254964 A1* | 12/2004 | Kodama et al. | 707/204 |
| 2005/0278391 A1* | 12/2005 | Spear et al. | 707/201 |

OTHER PUBLICATIONS

IBM Corporation, "Single Subsystem PPRC Copy", Research Disclosure, vol. 42, No. 418, Article 41888, Feb. 1999, p. 264.

EMC Corporation, "EMC TimeFinder: Create Mirror Images of Active Production Data." [online] © EMC Corporation, [Retrieved on May 13, 2003], retrieved from the Internet at <URL: http://www.emc.com/products/software/timefinder.jsp.>.

EMC Corporation, "EMC TimeFinder: Data Sheet", [online], © 2003 EMC Corporation, [Retrieved on May 13, 2003], retrieved from the Internet at <URL: http://www.emc.com/products/product_pdfs/ds/timefinder_1700-4.pdf>.

EMC Corporation, "EMC TimeFinder Product Description Guide", [online], © 1998 EMC Corporation, pp. 1-32, [Retrieved on May 13, 2003], retrieved from the Internet at <URL: http://www.emc.com/products/product_pdfs/pdg/timefinder_pdg.pdf>.

Hitachi Data Systems Corporation, "CARE-the *Copy* suite", [online] © 1999 Hitachi Data Systems Corporation, [Retrieved on May 13, 2003], retrieved from the Internet at <URL: http://www.hds.com/pdf/shadowim_flyer.pdf>.

Hitachi Data Systems Corporation, "NanoCopy", [online] © 2001 Hitachi Data Systems Corporation, [Retrieved on May 13, 2003], retrieved from the Internet at <URL: http://www.hds.com/pdf/hitachinano.pdf>.

Storage Technology Corporation, "StorageTek SnapShot", [online] © 2001 Storage Technology Corporation, [Retrieved on May 13, 2003], retrieved from the Internet at <URL: http://www.storagetek.com/prodserv/pdfs/SnapShot.ms2010be-pBR06_01.pdf>.

\* cited by examiner

INSTANT VIRTUAL COPY TO A PRIMARY MIRRORING PORTION OF DATA

BACKGROUND

1. Field

Implementations of the invention relate to an instant virtual copy to a primary mirroring portion of data.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives, otherwise referred to as a Direct Access Storage Device (DASD). Hosts may communicate Input/Output (I/O) requests to the storage space through the storage controller.

Some disaster recovery systems address data loss over a period of time, in which case writes to volumes on data storage may be lost. The writes may update data, write new data, or write the same data again. To assist in recovery of data writes, a copy of data may be provided at a remote location. Such copies may also be referred to as dual or shadow copies. International Business Machines Corporation (IBM), the assignee of the subject patent application, provides remote mirroring systems, including a Peer-to-Peer Remote Copy (PPRC) service (e.g., a PPRC Extended Distance service or a synchronous PPRC service) and an Extended Remote Copy (XRC) service in an Enterprise Storage Server® (ESS) system.

The remote mirroring systems provide techniques for mirroring data in order to facilitate recovery after a system failure. Such data shadowing systems can also provide an additional remote copy for non-recovery purposes, such as local access at a remote site.

In remote mirroring systems data is maintained in volume pairs. A volume pair is comprised of a volume in a primary storage device and a corresponding volume in a secondary storage device that includes a copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

A number of direct access storage device (DASD) subsystems are capable of performing "instant virtual copy" operations, also referred to as "fast replicate functions." Instant virtual copy operations work by modifying metadata in structures, such as relationship tables or pointers, to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and storage subsystem to perform other tasks. The host or storage subsystem may even proceed to create an actual, physical copy of the original data object during background processing, or at another time.

One such instant virtual copy operation is known as a FlashCopy® operation. A FlashCopy® operation involves establishing a logical point-in-time relationship between source and target volumes on the same or different devices. The FlashCopy® operation guarantees that until a track in a FlashCopy® relationship has been hardened to its location on the target disk, the track resides on the source disk. A relationship table is used to maintain information on all existing FlashCopy® relationships in the subsystem. During the establish phase of a FlashCopy® relationship, one entry is recorded in the source and target relationship tables for the source and target that participate in the FlashCopy® being established. Each added entry maintains all the required information concerning the FlashCopy® relationship. Both entries for the relationship are removed from the relationship tables when all FlashCopy® tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the FlashCopy® relationship have not yet been copied over and are thus protected tracks. Each track in the target device is represented by one bit in the bitmap. The target bit is set (e.g., either logically or physically) when the corresponding track is established as a target track of a FlashCopy® relationship. The target bit is reset when the corresponding track has been copied from the source location and destaged to the target device due to writes on the source or the target device, or a background copy task.

Further details of the FlashCopy® operations are described in the copending and commonly assigned U.S. Pat. No. 6,611,901, issued on Aug. 26, 2003, U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

Once the logical relationship is established, hosts may then have immediate access to data on the source and target volumes, and the data may be copied as part of a background operation. A read to a track that is a target in a FlashCopy® relationship not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any destages to tracks on the source device that have not been copied over triggers a destage intercept, which causes the tracks on the source device to be copied to the target device.

Instant virtual copy techniques have been developed, at least in part, to quickly create a duplicate copy of data without interrupting or slowing foreground processes. Instant virtual copy techniques, such as a FlashCopy® operation, provide a point-in-time copy tool. Instant virtual copy techniques may be used for a variety of applications, including, for example, data backup, data migration, data mining, testing, etc. For example, an instant virtual copy technique may be used for the creation of a physical "backup" copy of the source data, to aid in disaster recovery.

Currently, a PPRC primary volume can not be the target of a FlashCopy® relationship. This is because the data that is moved by the FlashCopy® operation does not get written via a host interface that is subject to the normal PPRC write intercept. Instead, FlashCopy® operations set up structures so that a read or write of a FlashCopy® track accesses the data from the appropriate volume.

Although the instant virtual copy techniques, such as FlashCopy® operations, are useful for copying large amounts of data, conventional instant virtual copy techniques may be improved.

SUMMARY OF THE INVENTION

Provided are an article of manufacture, system, and method for performing a copy operation. An instant virtual copy operation is issued from a first portion of data to a primary mirroring portion of data, wherein the primary mirroring portion of data corresponds to a secondary mirroring portion of data, and wherein the primary mirroring portion of data and the secondary mirroring portion of data are in a mirroring relationship. The mirroring relationship is transitioned to a duplex pending state in response to determining that the mirroring relationship is in a full duplex state. When the mirroring relationship is in a duplex pending state, each block of data involved in the instant virtual copy operation is transferred from the primary mirroring portion of data to the secondary mirroring portion of data.

BRIEF DESCRIPTION OF THE DRAWINGS

Referring now to the drawings in which like reference numbers represent corresponding parts throughout.

DETAILED DESCRIPTION OF THE IMPLEMENTATIONS

In the following description, reference is made to the accompanying drawings which form a part hereof and which illustrate several implementations of the invention. It is understood that other implementations may be utilized and structural and operational changes may be made without departing from the scope of implementations of the invention.

In certain implementations, an instant virtual copy (e.g., a FlashCopy® operation) of data may be made onto a primary mirroring portion of data (e.g., a PPRC primary mirroring volume). In this case, a secondary mirroring portion of data that corresponds to the primary mirroring portion of data and that is in a mirroring relationship with the primary mirroring portion of data reflects any changes made by the instant virtual copy. A primary mirroring portion of data (e.g., volume) may be described as a portion of data that is the source of a remote mirroring copy operation (e.g., a PPRC or XRC copy operation), and a secondary mirroring portion of data (e.g., a volume) may be described as a portion of data that is a target of the remote mirroring copy operation.

Figure 1A:
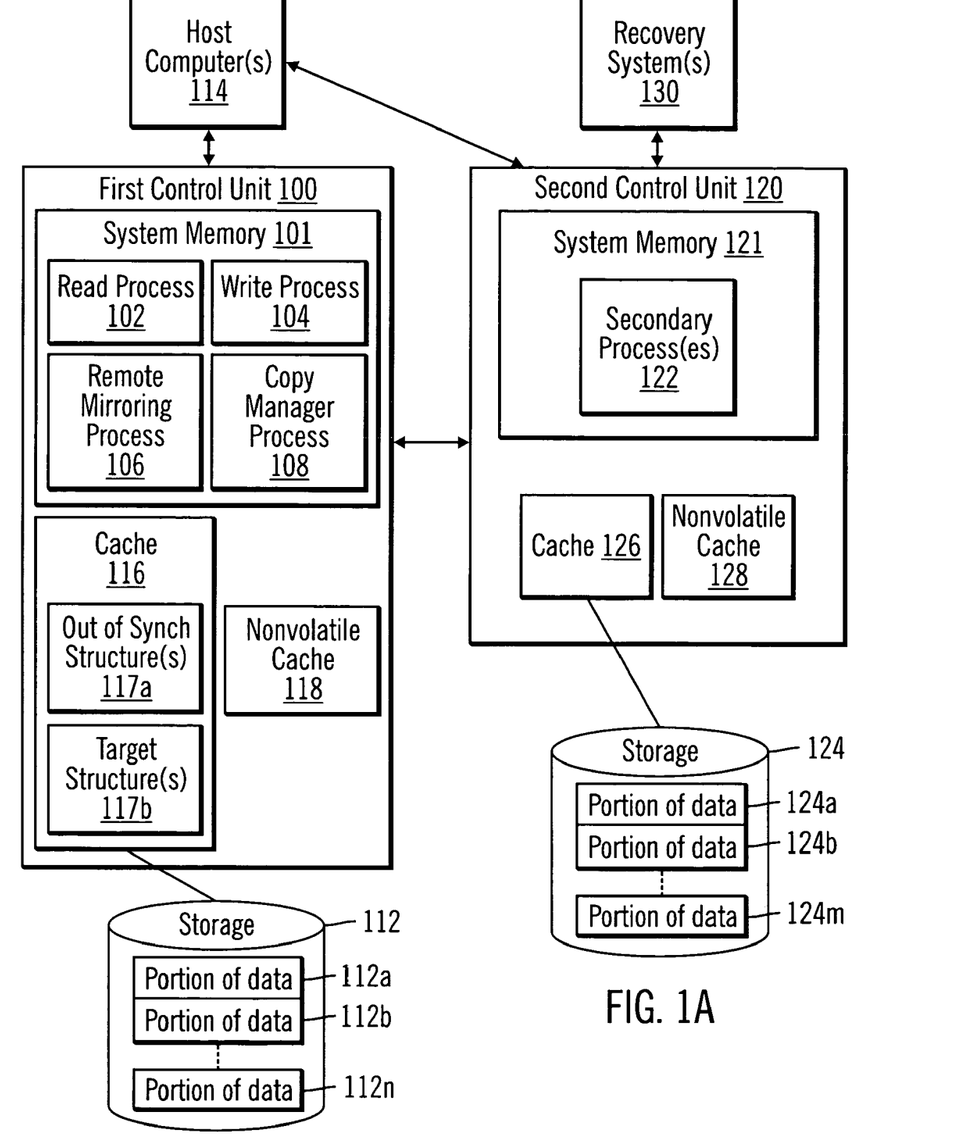
FIGS. 1A and 1B illustrate, in block diagrams, a computing environment in accordance with certain implementations of the invention.
Figure 1B:
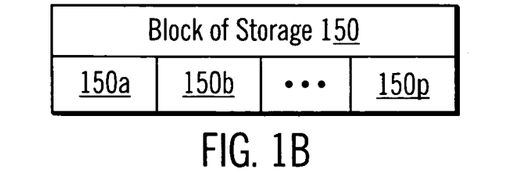

FIGS. 1A and 1B illustrate, in block diagrams, a computing environment in accordance with certain implementations of the invention. A first control unit 100 provides one or more host computers 114 access to storage 112, such as Direct Access Storage Device (DASD). The first control unit 100 receives Input/Output (I/O) requests from host computers 114 (e.g., over a network) directed toward storage 112 configured to have portions of data (such as volumes (e.g., Logical Unit Numbers, Logical Devices, etc.)) 112a, b, . . . n, where n represents that there may be any number of portions of data. Although the term volumes may be used in examples herein, implementations of the invention are applicable to any portions of data.

The storage 112 may be divided into blocks of storage 150 (FIG. 1B) containing blocks of data, and the blocks of storage 150 are further divided into sub-blocks of storage (150a, . . . p, where p represents that there may be any number of sub-blocks) that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The first control unit 100 includes a cache 116 in which updates to tracks in the storage 112 are maintained until written to storage 112 (i.e., the tracks are destaged). The cache 116 may also include one or more out of sync structures 117a and one or more target structures 117b. Each out of sync structure 117a is used to determine which blocks of storage (e.g., tracks) have been modified since a last transfer to the second control unit 120, without regard to the particular modified sub-blocks (e.g., sectors) of the block of storages. Each target structure 117b is used to monitor updates to blocks of storage after an instant virtual copy relationship has been established between a source and a target.

Additionally, the first control unit 100 includes a nonvolatile cache 118. The non-volatile cache 118 may be, for example, a battery-backed up volatile memory, to maintain a non-volatile copy of data updates and other information.

The first control unit 100 includes system memory 101 in which a read process 102 for reading data, and a write process 104 for writing data reside. The system memory 101 also includes a remote mirroring process 106 for transferring data from the first control unit 100 to remote storage, such as storage at the second control unit 120. That is, the remote mirroring process 106 performs a remote mirroring copy operation. A copy manager process 108 resides in system memory and is executed to perform processing in accordance with implementations of the invention.

In certain implementations, the remote mirroring process 106 may perform synchronization of data for an asynchronous PPRC Extended Distance service. In such cases, the remote mirroring process 106 runs continuously for the PPRC Extended Distance service. In certain implementations, the remote mirroring process 106 may perform synchronization of data for a synchronous PPRC service. In certain implementations, there may be multiple remote mirroring processes (e.g., one remote mirroring process for each portion of data on storage 112).

Second control unit 120 includes system memory 121 in which one or more secondary processes 122 reside. Secondary processes 122 may perform various functions or tasks. Second control unit 120 provides host computers 114 and one or more recovery systems 130 access to disk storage, such as storage 124, which maintains back-up copies of all or a subset of the portions of data of the storage 112. The second control unit 120 also includes a cache 126 in which updates to tracks in the storage 124 may be maintained until written to storage 124 (i.e., the tracks are destaged). Additionally, the second control unit 120 includes a nonvolatile cache 128. The nonvolatile cache 128 may be, for example, a battery-backed up volatile memory, to maintain a non-volatile copy of data updates and other information.

Storage 124 may be a Direct Access Storage Device (DASD). Storage 124 maintains copies of all or a subset of the portions of data 112a, . . . n of the storage 112. Additionally, storage 124 may be modified by, for example, host computers 114 and/or recovery systems 130. Storage 124 is configured to have portions of data (such as volumes (e.g., Logical Unit Numbers, Logical Devices, etc.)) 124a, . . . m, where m represents that there may be any number of portions of data. The portions of data 124a, . . . m may be divided into blocks of storage 150 (FIG. 1B) containing blocks of data, and the blocks of storage 150 are further divided into sub-blocks of storage (150a, , . . . p) that contain sub-blocks of data. A portion of data may be any logical or physical element of storage. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage, such as storage 124) may be used to maintain back-up copies of all or a subset of the storage 112, and the techniques of the invention transfer data to the removable storage rather than to the remote storage. The removable storage may reside at the first control unit 100.

In certain implementations, the first control unit 100 and second control unit 120 may be comprised of the IBM 3990, Model 6 Storage Controller, Enterprise Storage Server®, or any other control unit known in the art.

In certain implementations, the host computers 114, recovery system 130, first control unit 100 and/or second control unit 120 may comprise any computing device known in the art, such as a mainframe, server, personal computer, workstation, laptop, handheld computer, telephony device, network appliance, virtualization device, storage controller, etc.

A primary site may include multiple first control units, storage, and host computers. A secondary site may include multiple second control units, recovery systems, and storage.

In certain implementations of the invention, data is maintained in volume pairs. A volume pair is comprised of a volume in a first storage device (e.g., storage 112) and a corresponding volume in a second storage device (e.g., storage 124) that includes a copy of the data maintained in the volume at the first storage device. For example, volume 112a at storage 112 may correspond to volume 124a at storage 124.

In certain implementations, the first control unit 100 and second control unit 120 communicate via communication paths, such as direct high speed transmission lines (e.g., an Enterprise System Connection (ESCON®) link. However, the communication paths may be comprised of any other communication means known in the art, including network transmission lines, fiber optic cables, etc.

Figure 2A:
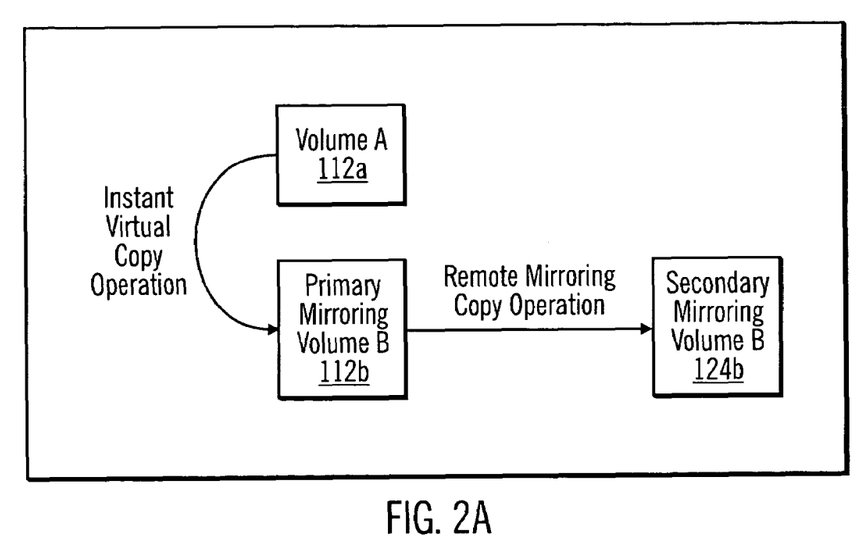
FIGS. 2A and 2B illustrate copy operations in accordance with certain implementations of the invention.

FIGS. 2A and 2B illustrate copy operations in accordance with certain implementations of the invention. In FIG. 2A, a remote mirroring copy operation is issued from primary mirroring volume B 112b to secondary mirroring volume B 124b, and an instant virtual copy operation is issued from volume 112a to primary mirroring volume 112b. Primary mirroring volume B 112b and secondary mirroring volume B 124b are said to be in a mirroring relationship. The volume from which the instant virtual copy operation is issued may be any type of volume (e.g., a primary mirroring volume, a secondary mirroring volume, a volume that is not in a mirroring relationship, etc.). With implementations of the invention, when the instant virtual copy operation from volume A 112a to primary mirroring volume B 112b is performed, the result of this operation is reflected at secondary mirroring volume B 124b.

Figure 2B:
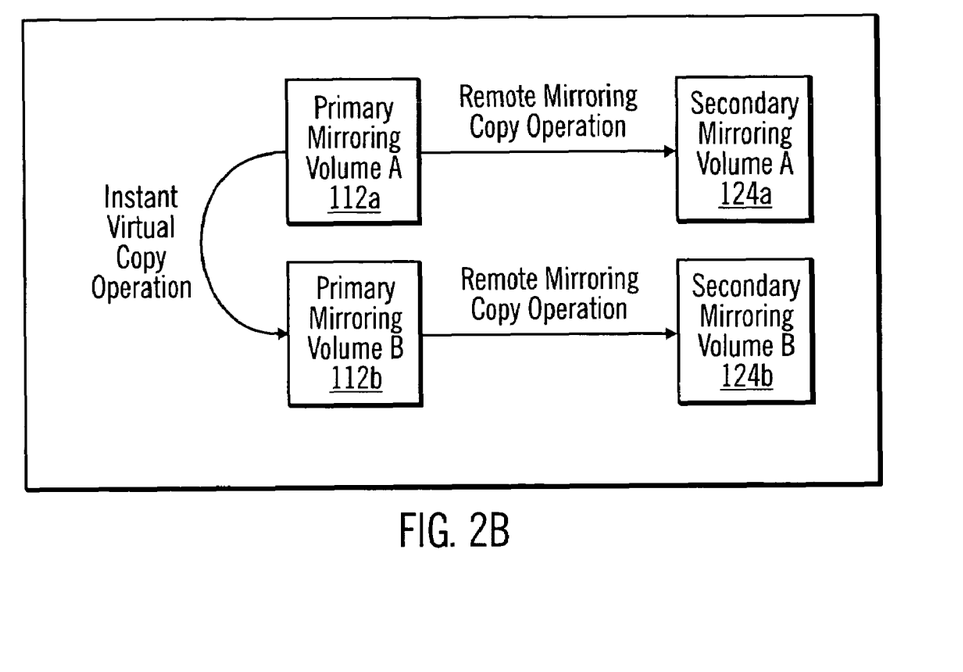

In FIG. 2B, a first remote mirroring copy operation is issued from primary mirroring volume A 112a to secondary mirroring volume A 124a, and a second remote mirroring copy operation is issued from primary mirroring volume B 112b to secondary mirroring volume B 124b. Primary mirroring volume A 112a and secondary mirroring volume A 124a are said to be in a mirroring relationship. Similarly, primary mirroring volume B 112b and secondary mirroring volume B 124b are said to be in a mirroring relationship. Additionally, an instant virtual copy operation is issued for primary mirroring volume 112a to primary mirroring volume 112b. With implementations of the invention, when the instant virtual copy operation from primary mirroring volume A 112a to primary mirroring volume B 112b is performed, the result of this operation is reflected at secondary mirroring volume B 124b.

The example scenarios described in FIGS. 2A and 2B are provided merely to enhance understanding of implementations of the invention and are not meant to limit implementations of the invention in any manner. For example, although the example scenarios illustrate that primary mirroring volumes are located at storage 112 connected to the first control unit 100, implementations of the invention are applicable to primary mirroring volumes located at storage 124 connected to the second control unit 120.

Figure 3A:
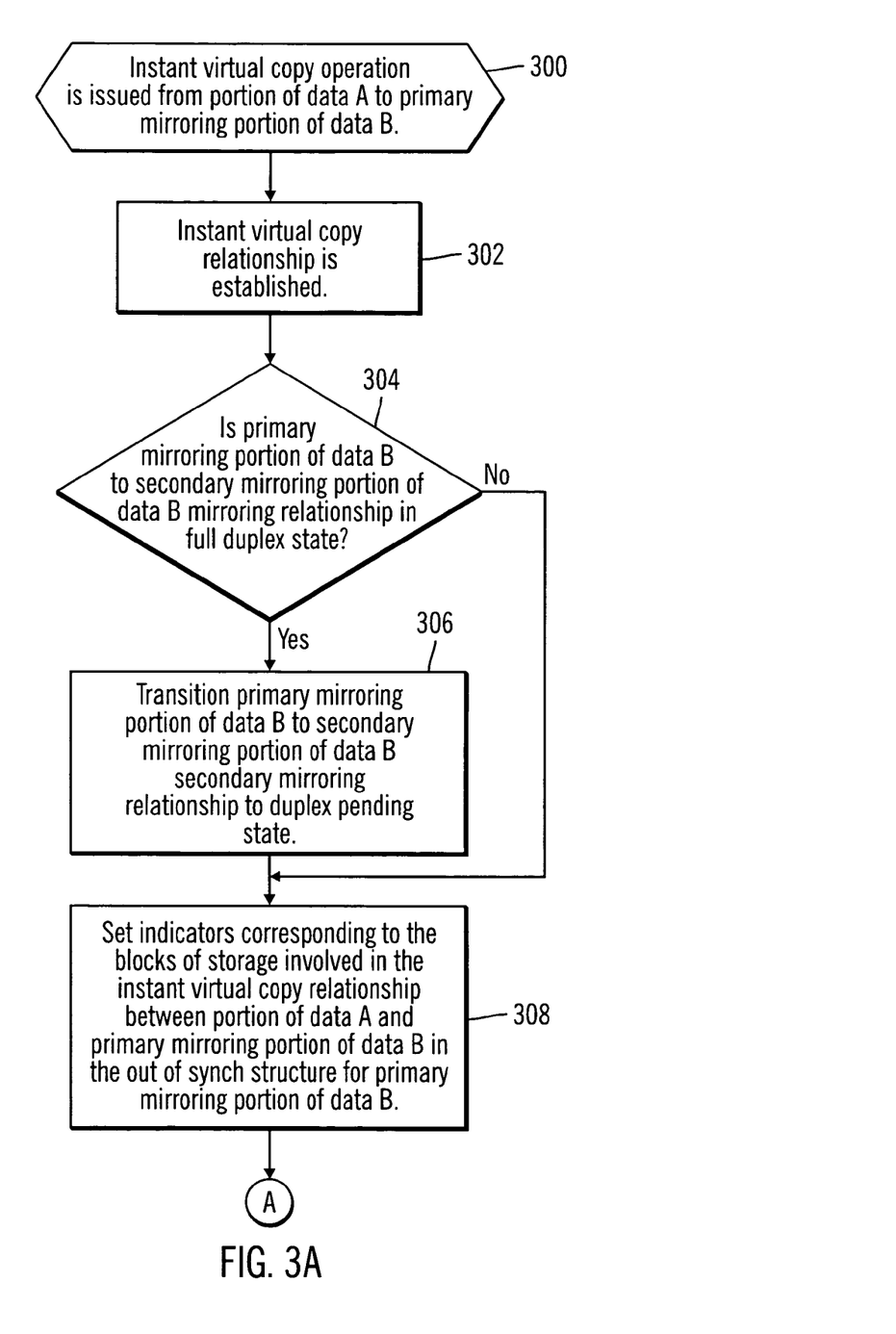
FIGS. 3A and 3B illustrate operations performed to enable an instant virtual copy operation on a primary mirroring volume in accordance with certain implementations of the invention.
Figure 3B:
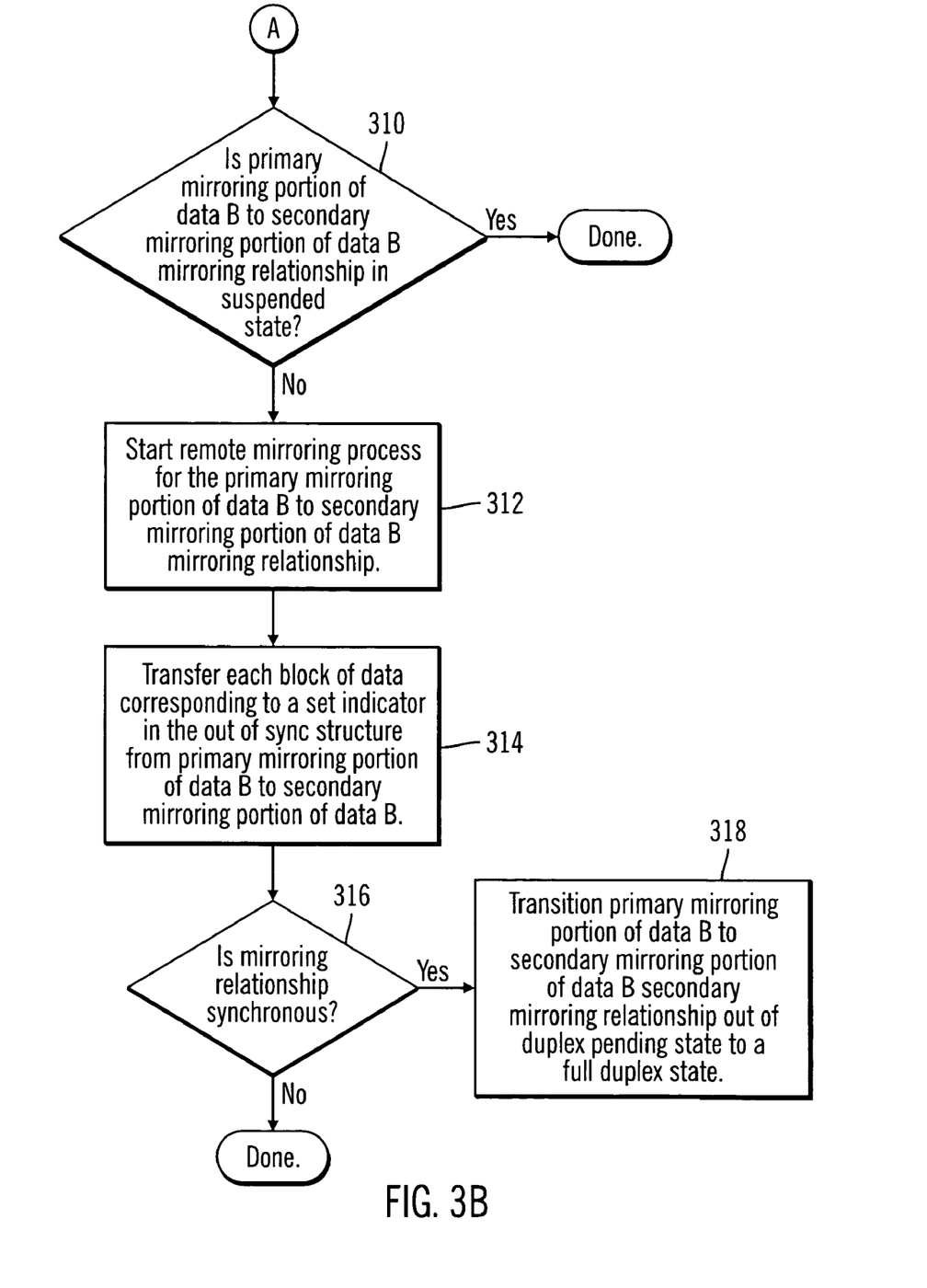

FIGS. 3A and 3B illustrate operations performed to enable an instant virtual copy operation on a primary mirroring portion of data in accordance with certain implementations of the invention. Control begins at block 300 with an instant virtual copy operation being issued from a portion of data A to a primary mirroring portion of data B. Primary mirroring portion of data B is in a mirroring relationship with corresponding secondary mirroring portion of data B. Although the terms portion of data A, primary mirroring portion of data B, and secondary mirroring portion of data B are used for ease of illustration, a remote mirroring copy operation may be issued between any two portions of data (e.g., volumes), and an instant virtual copy operation may be issued between any two portions of data for which the target portion of data is a source of a remote mirroring copy operation (i.e., a primary mirroring portion of data). Also, in certain implementations, portion of data A may be a primary mirroring portion of data in a mirroring relationship with a corresponding secondary mirroring portion of data A.

In block 302, an instant virtual copy relationship is established, for example, by generating structures so that a read or write of data involved in the instant virtual copy operation accesses the data from the appropriate portion of data.

In block 304, the copy manager process 108 determines whether a primary mirroring portion of data B to a secondary mirroring portion of data B mirroring relationship is in a full duplex state. The mirroring relationship may be in a full duplex state, a duplex pending state or a suspended state. A full duplex state may be described as a state that is entered when mirrored copies of data are duplicates of each other (e.g., primary mirroring portion of data B and secondary mirroring portion of data B contain duplicate data). A duplex pending state may be described as a state that is entered when mirrored copies of data are not duplicates of each other (e.g., a process is currently copying updates from primary mirroring portion of data B to secondary mirroring portion of data B). If a copy operation does not complete successfully, a "suspended" state is entered. During the suspended state, data is not transferred from the primary mirroring portion of data to the secondary mirroring portion of data and changes are recorded in an out of sync structure 117a.

From block 304, if the primary mirroring portion of data B to the secondary mirroring portion of data B mirroring relationship is in a full duplex state, processing continues to block 306, otherwise, processing continues to block 308. In block 306, the copy manager process 108 transitions the primary mirroring portion of data B to the secondary mirroring portion of data B mirroring relationship to the duplex pending state from the full duplex state.

In block 308, the copy manager process 108 sets indicators corresponding to the blocks of data (e.g., content of tracks) involved in the instant virtual copy relationship between portion of data A and primary mirroring portion of data B in an out of sync structure 117a for primary mirroring portion of data B. To set the indicators in the out of sync structure 117a, the out of sync structure 117a is updated (i.e., OR'd) with indicators set in a target structure 117b. When the mirroring relationship is synchronous, the out of sync structure is not active, but the out of sync structure is made active when an instant virtual copy relationship is established and duplex pending state is entered. When the mirroring relationship is asynchronous, the out of sync structure is made active when the mirroring relationship is established.

The out of sync structure 117a includes an out of sync (OOS) indicator (e.g., bit) for each block of data (e.g., content of a track), which indicates whether any portion of the block of data has been modified since the last time the block of data was copied to the second control unit 120. When an indicator is set to a first value (e.g., one), the setting indicates that the block of data has been updated since the last transfer (e.g., due to a PPRC copy operation). When an indicator is set to a second value (e.g., zero), the setting indicates that the block of data has not been updated since the last transfer (e.g., due to a PPRC copy operation).

The target structure 117b includes an indicator (e.g., a bit) for each block of data in the source storage that is part of the instant virtual copy relationship. When an indicator is set to a first value (e.g., one), the setting indicates that the block of data has not been copied from the portion of the source storage to the target storage. When an indicator is set to a second value (e.g., zero), the setting indicates that the block of data has been copied from the portion of the source storage to the portion of the target storage.

In certain implementations, there is one out of sync structure 117a and one target structure 117b for each portion of data on storage 112. In certain implementations, the out of sync structure 117a and target structure 117b reside in volatile cache, such as cache 116, with a copy on storage 112, and only changes to the out of sync structure 117a and/or target structure 117b are stored in nonvolatile storage (e.g., nonvolatile cache 118 or disk).

In block 310, the copy manager process 108 determines whether the primary mirroring portion of data B to secondary mirroring portion of data B mirroring relationship is in a suspended state (i.e., block 306 processing was skipped). If so, processing is done, otherwise, processing continues to block 312. When the mirroring relationship is in the suspended state, the indicators in the out of sync structure are set, but data is not transferred from the primary mirroring portion of data to the secondary mirroring portion of data. However, if a resync command is issued to resync the suspended portions of data, data is transferred from primary mirroring portion of data B to secondary mirroring portion of data B based on the indicators set in the out of sync structure.

In block 312, the copy manager process 108 starts a remote mirroring process 106 for the primary mirroring portion of data B to secondary mirroring portion of data B mirroring relationship. In block 314, the remote mirroring process 106 transfers each block of data (e.g., content of a track) corresponding to a set indicator in the out of sync structure 117a for primary mirroring portion of data B from primary mirroring portion of data B to secondary mirroring portion of data B.

Once the copying is completed, portion of data in block 316, the copy manager process 108 determines whether the primary mirroring portion of data B to secondary mirroring portion of data B mirroring relationship is synchronous. If so, processing continues to block 318, otherwise, processing is done. In block 318, the copy process manager 108 transitions the primary mirroring portion of data B to secondary mirroring portion of data B mirroring relationship out of the duplex pending state to a full duplex state.

Thus, in certain implementations, the copy manager process 108 transitions primary and secondary mirroring volumes in a PPRC mirroring relationship into a duplex pending state, if the volumes are not already in the duplex pending or suspended states, and then sets indicators in the out of sync structure for each FlashCopy® track being copied to a PPRC primary mirroring volume. Once the PPRC copy operation makes a pass through the out of sync structure, the changed tracks will have been transferred to the secondary mirroring volume, and the pair of primary and secondary mirroring volumes is transitioned back to a full duplex state if the mirroring relationship between them is synchronous.

For suspended volumes, the indicators in the out of sync structure are set, but the primary mirroring volumes remain suspended. If a resync command is issued to resync the suspended volumes, the tracks that were copied over with the FlashCopy® operation are transferred to the secondary mirroring volume.

FlashCopy, IBM, Enterprise Storage Server, and ESCON are registered trademarks or common law marks of International Business Machines Corporation in the United States and/or other countries.

ADDITIONAL IMPLEMENTATION DETAILS

The described embodiments may be implemented as a method, apparatus or article of manufacture using programming and/or engineering techniques to produce software, firmware, hardware, or any combination thereof. The terms "article of manufacture" and "circuitry" as used herein refer to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 3A and 3B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic or in some combination of hardware, software, or gate array logic.

Figure 4:
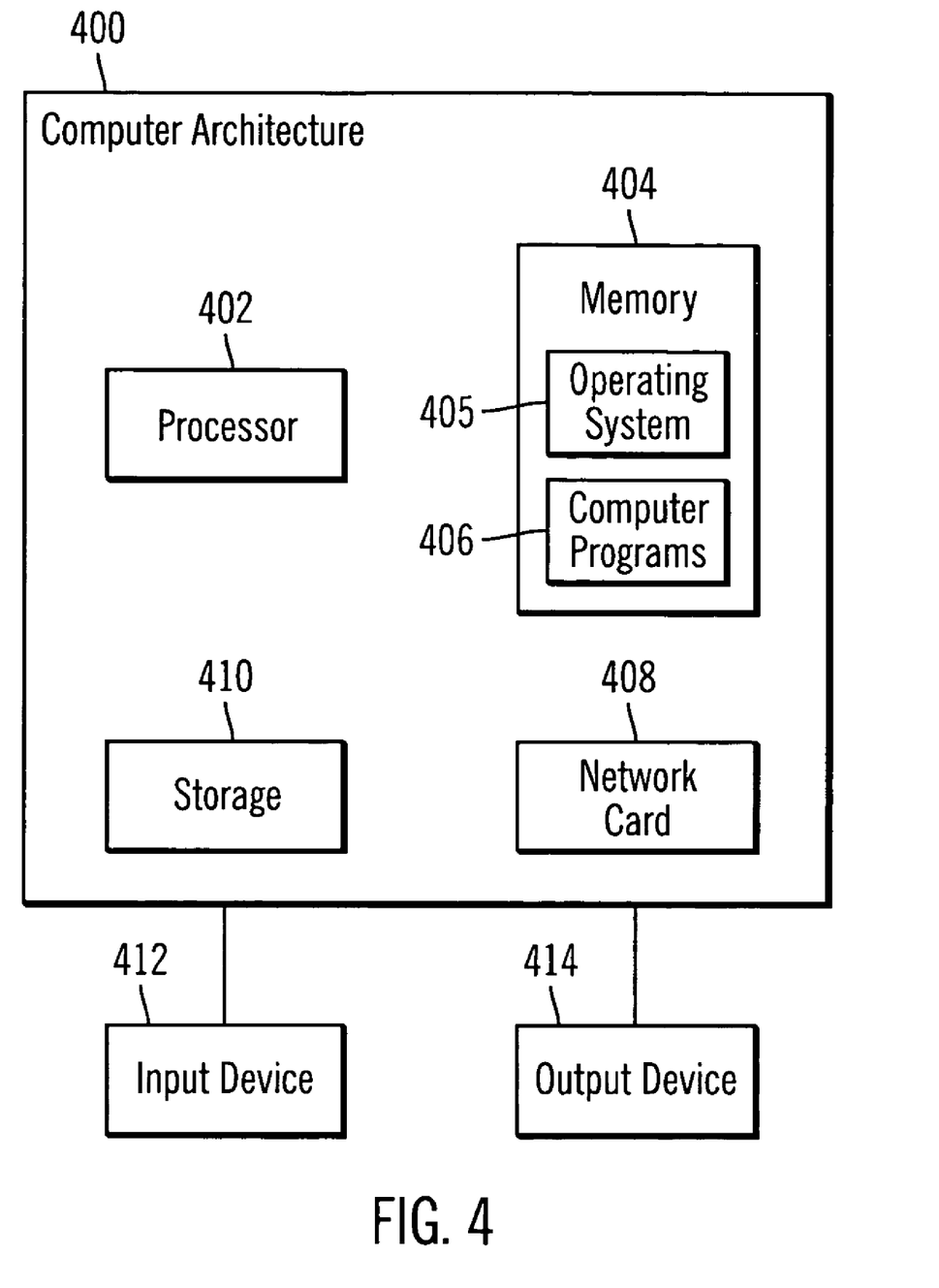
FIG. 4 illustrates an architecture of a computer system that may be used in accordance with certain implementations of the invention

FIG. 4 illustrates an architecture of a computer system that may be used in accordance with certain implementations of the invention. Host computers 114, first control unit 100, and/or second control unit 120 may implement computer architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for performing a copy operation, comprising:

issuing a remote mirroring copy operation from a primary mirroring portion of data to a secondary mirroring portion of data, wherein the primary mirroring portion of data is a source of the remote mirroring copy operation and the secondary mirroring portion of data is a target of the remote mirroring copy operation;

issuing an instant virtual copy operation from a first portion of data to the primary mirroring portion of data, wherein the primary mirroring portion of data corresponds to the secondary mirroring portion of data, and wherein the primary mirroring portion of data and the secondary mirroring portion of data are in a mirroring relationship based on the remote mirroring copy operation;

in response to receiving the instant virtual copy operation, transitioning the mirroring relationship to a duplex pending state in response to determining that the mirroring relationship is in a full duplex state;

setting indicators corresponding to blocks of data involved in the instant virtual copy operation from the first portion of data to the primary mirroring portion of data in an out of sync structure associated with the primary mirroring portion of data, wherein the out of sync structure indicates which blocks of data in the primary mirroring portion of data have been modified since a last time the blocks of data were copied to the secondary mirroring portion of data, wherein the out of sync structure is updated based on indicators set in a target structure that includes an indicator for each block of data in the first portion of data that is part of the instant virtual copy relationship between the first portion of data and the primary mirroring portion of data and that indicates whether the block of data has been copied from the first portion of data to the primary mirroring portion of data; and when the mirroring relationship is in a duplex pending state, transferring each block of data involved in the instant virtual copy operation from the primary mirroring portion of data to the secondary mirroring portion of data based on the indicators set in the out of sync structure.

2. The method of claim 1, further comprising:

when the mirroring relationship is in the duplex pending state, starting a remote mirroring process to transfer each block of data involved in the instant virtual copy operation from the primary mirroring portion of data to the secondary mirroring portion of data.

3. The method of claim 1, further comprising:
after transferring each block of data, transitioning the mirroring relationship to a full duplex state in response to determining that the mirroring relationship is synchronous.

4. The method of claim 1, further comprising:
determining whether the primary mirroring volume to the secondary mirroring volume relationship is in the full duplex state, the duplex pending state or in a suspended state.

5. The method of claim 1, further comprising:
when the mirroring relationship is in the suspended state,
receiving a resync command to resync the suspended portion of data; and
transferring each block of data involved in the instant virtual copy operation from the primary mirroring portion of data to the secondary mirroring portion of data based on the indicators set in the out of sync structure.

6. The method of claim 1, wherein the first portion of data is in a mirroring relationship.

7. An article of manufacture for performing a copy operation, wherein the article of manufacture consists of a computer readable storage medium storing instructions, and wherein the article of manufacture is operable to:
issue a remote mirroring copy operation from a primary mirroring portion of data to a secondary mirroring portion of data, wherein the primary mirroring portion of data is a source of the remote mirroring copy operation and the secondary mirroring portion of data is a target of the remote mirroring copy operation;
issue an instant virtual copy operation from a first portion of data to the primary mirroring portion of data, wherein the primary mirroring portion of data corresponds to the secondary mirroring portion of data, and wherein the primary mirroring portion of data and the secondary mirroring portion of data are in a mirroring relationship based on the remote mirroring copy operation;
in response to receiving the instant virtual copy operation,
transition the mirroring relationship to a duplex pending state in response to determining that the mirroring relationship is in a full duplex state;
set indicators corresponding to blocks of data involved in the instant virtual copy operation from the first portion of data to the primary mirroring portion of data in an out of sync structure associated with the primary mirroring portion of data, wherein the out of sync structure indicates which blocks of data in the primary mirroring portion of data have been modified since a last time the blocks of data were copied to the secondary mirroring portion of data, wherein the out of sync structure is updated based on indicators set in a target structure that includes an indicator for each block of data in the first portion of data that is part of the instant virtual copy relationship between the first portion of data and the primary mirroring portion of data and that indicates whether the block of data has been copied from the first portion of data to the primary mirroring portion of data; and
when the mirroring relationship is in a duplex pending state, transfer each block of data involved in the instant virtual copy operation from the primary mirroring portion of data to the secondary mirroring portion of data based on the indicators set in the out of sync structure.

8. The article of manufacture of claim 7, wherein the article of manufacture is further operable to:
when the mirroring relationship is in the duplex pending state, start a remote mirroring process to transfer each block of data involved in the instant virtual copy operation from the primary mirroring portion of data to the secondary mirroring portion of data.

9. The article of manufacture of claim 7, wherein the article of manufacture is further operable to:
after transferring each block of data, transition the mirroring relationship to a full duplex state in response to determining that the mirroring relationship is synchronous.

10. The article of manufacture of claim 7, wherein the article of manufacture is further operable to:
determine whether the primary mirroring volume to the secondary mirroring volume relationship is in the full duplex state, the duplex pending state or in a suspended state.

11. The article of manufacture of claim 7, wherein the article of manufacture is further operable to:
when the mirroring relationship is in the suspended state,
receive a resync command to resync the suspended portion of data; and
transfer each block of data involved in the instant virtual copy operation from the primary mirroring portion of data to the secondary mirroring portion of data based on the indicators set in the out of sync structure.

12. The article of manufacture of claim 7, wherein the first portion of data is in a mirroring relationship.

13. A system for performing a copy operation, comprising:
hardware logic operable to:
issue a remote mirroring copy operation from a primary mirroring portion of data to a secondary mirroring portion of data, wherein the primary mirroring portion of data is a source of the remote mirroring copy operation and the secondary mirroring portion of data is a target of the remote mirroring copy operation;
issue an instant virtual copy operation from a first portion of data to the primary mirroring portion of data, wherein the primary mirroring portion of data corresponds to the secondary mirroring portion of data, and wherein the primary mirroring portion of data and the secondary mirroring portion of data are in a mirroring relationship based on the remote mirroring copy operation;
in response to receiving the instant virtual copy operation,
transition the mirroring relationship to a duplex pending state in response to determining that the mirroring relationship is in a full duplex state;
set indicators corresponding to blocks of data involved in the instant virtual copy operation from the first portion of data to the primary mirroring portion of data in an out of sync structure associated with the primary mirroring portion of data, wherein the out of sync structure indicates which blocks of data in the primary mirroring portion of data have been modified since a last time the blocks of data were copied to the secondary mirroring portion of data, wherein the out of sync structure is updated based on indicators set in a target structure that includes an indicator for each block of data in the first portion of data that is part of the instant virtual copy relationship between the first portion of data and the primary mirroring portion of data and that indicates whether the block of data has been copied from the first portion of data to the primary mirroring portion of data; and when the mirroring relationship is in a duplex pending state, transfer each block of data involved in the instant virtual copy operation from the primary mirroring portion of data to the secondary mirroring portion of data based on the indicators set in the out of sync structure.

14. The system of claim 13, wherein the hardware logic is further operable to:

when the mirroring relationship is in the duplex pending state, start a remote mirroring process to transfer each block of data involved in the instant virtual copy operation from the primary mirroring portion of data to the secondary mirroring portion of data.

15. The system of claim 13, wherein the hardware logic is further operable to:

after transferring each block of data, transition the mirroring relationship to a full duplex state in response to determining that the mirroring relationship is synchronous.

16. The system of claim 13, wherein the hardware logic is further operable to:

determine whether the primary mirroring volume to the secondary mirroring volume relationship is in the full duplex state, the duplex pending state or in a suspended state.

17. The system of claim 13, wherein the hardware logic is further operable to:

when the mirroring relationship is in the suspended state, receive a resync command to resync the suspended portion of data; and transfer each block of data involved in the instant virtual copy operation from the primary mirroring portion of data to the secondary mirroring portion of data based on the indicators set in the out of sync structure.

18. The system of claim 13, wherein the first portion of data is in a mirroring relationship.

* * * * *